United States Patent [19]
Slade

[11] Patent Number: 5,489,108
[45] Date of Patent: Feb. 6, 1996

[54] FLEXIBLE FENDER

[76] Inventor: Val Slade, 314 SW. Railroad St., Sheridan, Oreg. 97378

[21] Appl. No.: 292,056

[22] Filed: Aug. 17, 1994

Related U.S. Application Data

[63] Continuation of Ser. No. 970,697, Nov. 13, 1992, abandoned.

[51] Int. Cl.$^6$ ........................................ B62B 9/16
[52] U.S. Cl. ...................... 280/152.3; 293/150; 403/220; 403/291
[58] Field of Search ............................. 280/152.1, 152.2, 280/152.3, 851; 293/126, 150, 151; 16/225, DIG. 13; 403/291, 220, 223, 50, 51

[56] References Cited

U.S. PATENT DOCUMENTS

| | | | |
|---|---|---|---|
| 558,377 | 4/1896 | Fox | 280/152.3 |
| 1,776,165 | 9/1930 | Scalpelli | 293/124 |
| 1,786,865 | 12/1930 | Reynolds | 293/150 |
| 2,160,439 | 5/1939 | Morrison | 293/145 |
| 2,167,186 | 7/1939 | Riehl | 293/145 |
| 2,884,250 | 4/1959 | Patterson | 403/50 X |
| 3,232,076 | 2/1966 | Sundt | 403/50 X |
| 3,746,113 | 7/1973 | Tidwell | 280/275 X |
| 3,924,888 | 12/1975 | Butcher et al. | 293/150 |
| 3,934,900 | 1/1976 | Wilson | 280/152.3 |
| 3,975,042 | 8/1976 | Montenare | 267/82 X |
| 3,992,047 | 11/1976 | Barenyi et al. | 293/9 |
| 4,268,053 | 5/1981 | Toppins et al. | 280/851 X |
| 4,319,763 | 3/1982 | White | 280/152.3 |
| 4,334,694 | 6/1982 | Iwanicki | 280/851 |
| 4,453,728 | 6/1984 | Verge | 280/851 |
| 4,620,713 | 11/1986 | Sakaguchi | 280/152.3 |

FOREIGN PATENT DOCUMENTS

| | | | |
|---|---|---|---|
| 30182 | 3/1926 | France | 293/150 |
| 766186 | 6/1934 | France | 293/150 |
| 67446 | 12/1940 | Poland | 280/152.3 |

*Primary Examiner*—Margaret A. Focarino
*Assistant Examiner*—Michael Mar
*Attorney, Agent, or Firm*—Charles N. Hilke

[57] ABSTRACT

A rear fender of a motorcycle, particularly a racing motorcycle, is securely connected to the cross frame under the motorcycle seat. The rear fender includes a front portion, a flexible center hinge, and a rear portion. The front portion is fixably connected under the motorcycle seat with the rear portion free to rotate about the hinge. The front portion can be of any desired length in order to fit the various models of motorcycles.

4 Claims, 1 Drawing Sheet

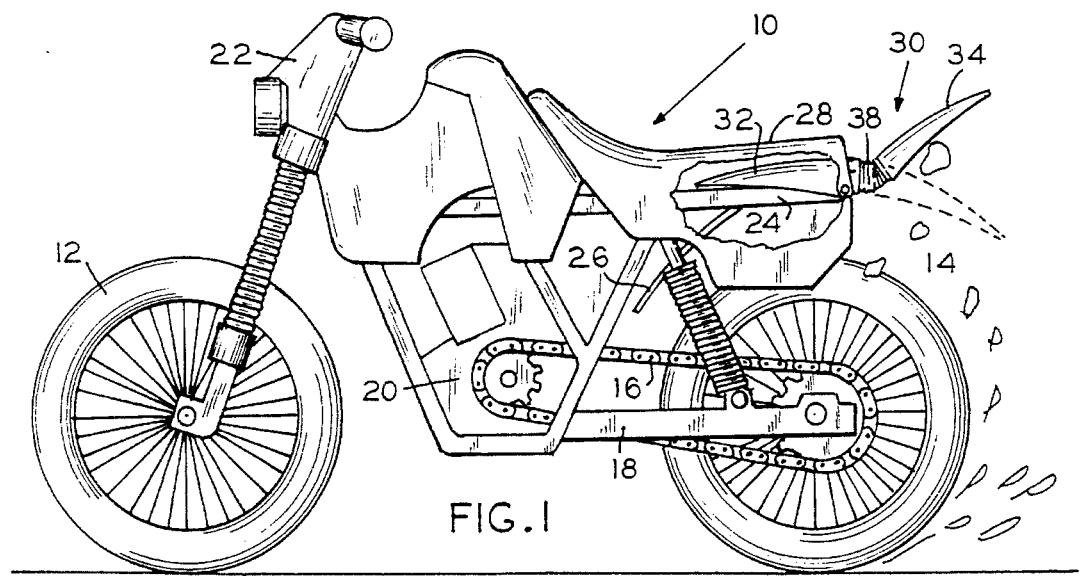
FIG. 1
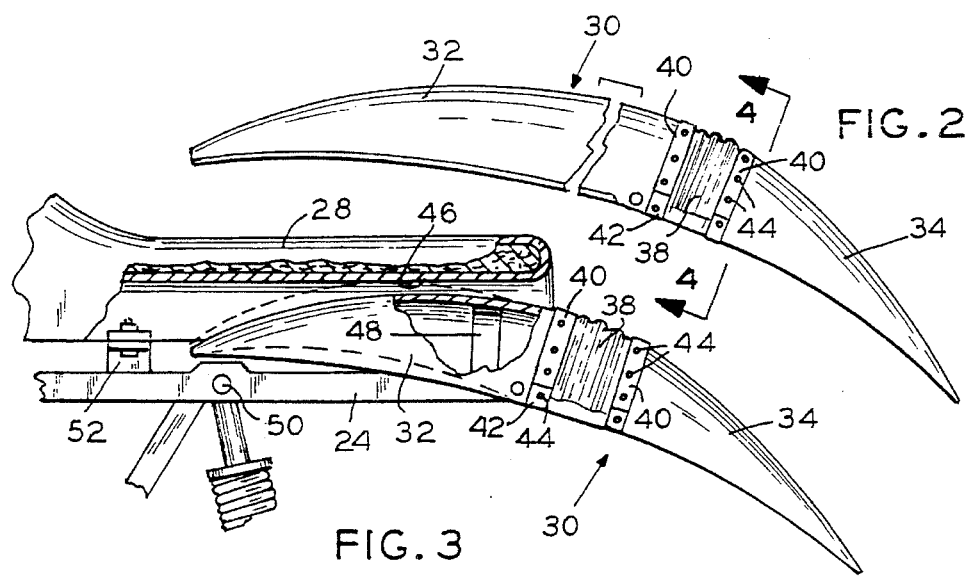
FIG. 2
FIG. 3
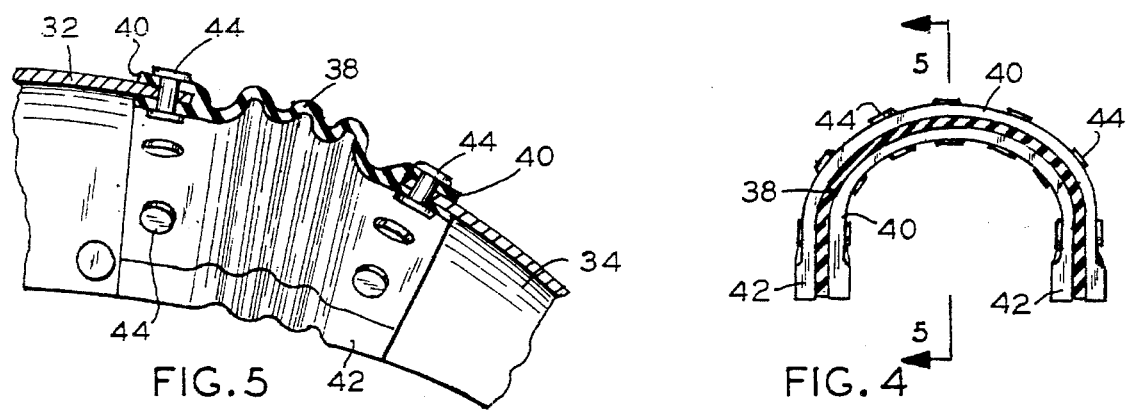
FIG. 5
FIG. 4

FLEXIBLE FENDER

This is a continuation of application Ser. No. 07/970,697 filed on Nov. 13, 1992, now abandoned.

BACKGROUND OF THE INVENTION

1. Nature of the Invention

This invention relates to a rear fender of a motorcycle secured under the motorcycle seat and, more particularly, it is concerned with a flexible rear fender.

2. Prior Art

Under the rules of motorcycle racing, rear fenders must be maintained on the vehicle throughout a race. If the rear fender breaks, the racer is disqualified. Because of the extreme stresses to which the rear fender is exposed during racing, this is a frequent occurrence.

The nearest prior art is as follows:

U.S. Pat. No. 1,776,165
U.S. Pat. No. 2,160,439
U.S. Pat. No. 2,167,186
U.S. Pat. No. 3,992,047
U.S. Pat. No. 3,975,042
U.S. Pat. No. 3,401,228
U.S. Pat. No. 558,377
U.S. Pat. No. 4,319,763
U.S. Pat. No. 3,934,900
U.S. Pat. No. 3,746,113
U.S. Pat. No. 4,620,713
German Patent No. 150,676

SUMMARY OF THE INVENTION

A rear fender of a motorcycle, particularly a racing motorcycle, is securely connected to the cross frame under the motorcycle seat. The rear fender includes a front portion, a flexible center hinge, and a rear portion. The front portion is fixably connected under the motorcycle seat with the rear portion free to rotate about the hinge. The front portion can be of any desired length in order to fit the various models of motorcycles.

It is an object of this invention to provide a flexible rear fender which is essentially unbreakable.

It is another further object to provide a flexible fender which fits many different motorcycles.

It is another further object to provide an easily attachable flexible rear fender.

It is a final object to provide a cost-effective flexible rear fender.

It is another object to construct the flexible rear fender from many different materials.

It is another object to provide a flexible hinge for placement of existing fenders.

BRIEF DESCRIPTION OF THE DRAWING

FIG. 1 is a side view of a motorcycle with the flexible fender attached.

FIG. 2 is a side view of the flexible fender.

FIG. 3 is a cutaway side view of a flexible fender under the motorcycle seat.

FIG. 4 is a view along lines 4—4 of FIG. 2 showing a cross section of the flexible fender.

FIG. 5 is a view along lines 5—5 of FIG. 4 showing another cross section of the flexible fender.

DETAILED DESCRIPTION OF THE PREFERRED EMBODIMENT

The preferred embodiments of the invention will now be described by referring to the accompanying drawings. FIG. 1 shows the motorcycle 10 with a front wheel 12 and a rear wheel 14 supported on a frame 18. A chain and sprocket drive system 16 provides power to the rear wheel 14 from the power source 20. The steering 22 allows control of the motorcycle 10. The motorcycle seat 28 is supported on a seat support frame 24. A rear fender 30 is comprised of a front portion 32 and a rear portion 34 connected by a flexible center hinge 38. The rear portion 34 is shown in ghost lines in its normal position.

In FIG. 2 the fender is shown with a break portion on the front portion 32 to indicate that the length of the front portion can be modified or cut by the purchaser in order to fit the style of motorcycle 10. Rivets 44 hold the flexible center hinge 38. The clevis end portions 40 of the flexible hinge 38 is shown. Rivets 44 attach the hinge 38 to the front portion 32 and the rear portion 34. The reinforced outer edges 42 of the flexible hinge 38 is shown. The fender mounting hole 54 is used to connect the fender to the seat support frame 24.

In FIG. 3 the fender 30 is shown under the bottom of the seat 46. Cross frame 48 is shown positioning the fender 30 under the seat 28 and above the seat support frame 24. On some motorcycle 10 a shock mountain boss 50 attaches to the seat support frame 24. Further more, a forward cross brace 52 is sometimes present.

FIG. 4 more specifically shows the reinforcing of the outer edge 42 of the flexible center hinge 38. Also, the rivets 44 are shown in their proper perspective.

FIG. 5 shows another cutaway view of the fender 30. The clevis end portions 40 are shown on both sides of the front portion 32 and the rear portion 34. The rivets 44 are shown joining the clevis 40 through each of the front portion 32 and the rear portion 34. The reinforcing of the outer edge 42 of the hinge 38 is also shown.

In operation, if an object strikes the rear portion of the fender 34 as shown in FIG. 1, the flexible hinge 38 absorbs the shock without breaking the rear portion 34. Additionally, any jarring is also absorbed in the hinge 38 because of its undulating design. This shows the flexible hinge 38 has three degrees of freedom; up and down, sideways, and compression and extension. In other words the rear portion 34 is pliable in all directions from the front portion 32. Please see FIG. 5.

Thus, the various forces which are applied to a rear fender are absorbed through the hinge so that the rear fender does not break and thus disqualifying the rider.

A hinge 38 may be added to an existing fender by cutting the fender into a front portion 32 and a rear portion 34. Positioning the clevis end portions 40 of the hinge 38 around the front portion 32 and rear portion 34 and then finally attaching by means of rivets 44 will construct a flexible fender 30. While rivets 44 have been used other fastening means may be used.

I claim:

1. A rear fender for a motorcycle comprising:

a) means to attach said rear fender to a motorcycle;

b) a front portion of said rear fender;

c) a rear portion of said rear fender; and d) a hinge for flexibly joining said rear portion to said front portion such that said rear portion is pliable in all directions upon deflection relative to said front portion and automatically returnable to an original non-deflected position, said hinge being fixably attached at one end to a rearward edge of said front portion and fixably attached at an opposite end to a forward edge of said rear portion, said hinge being made of a flexible material and having a plurality of undulations, and said hinge being shaped to form a continuum of an upper surface of each of said front and rear portions.

2. The rear fender of claim 1 where said means to attach said rear fender to a motorcycle comprise:

e) at least one fender mounting hole positioned within said front portion for attachment to a seat support frame of said motorcycle.

3. The rear fender of claim 2 additionally comprising nestling said front portion under a motorcycle seat.

4. The rear fender of claim 1 additionally comprising clevis end portions into which the rearward edge of said front portion and the forward edge of said rear portion fit.

* * * * *